United States Patent [19]

Tayloe

[11] Patent Number: 5,809,418

[45] Date of Patent: *Sep. 15, 1998

[54] POSITION-DEPENDENT CALL CONNECTION METHOD AND APPARATUS IN A RADIO-COMMUNICATION SYSTEM

[75] Inventor: Daniel Richard Tayloe, Phoenix, Ariz.

[73] Assignee: Motorola, Inc., Schaumburg, Ill.

[*] Notice: The term of this patent shall not extend beyond the expiration date of Pat. No. 5,689,803.

[21] Appl. No.: 519,221

[22] Filed: Aug. 25, 1995

[51] Int. Cl.$^6$ .................................................. H04B 7/185
[52] U.S. Cl. .......................... 455/428; 455/430; 455/456; 455/458
[58] Field of Search .................................. 455/12.1, 13.1, 455/33.1, 33.2, 34.1, 34.2, 54.1, 54.2, 427, 428, 429, 430, 450, 455, 456, 458; 379/59, 60, 209, 261

[56] References Cited

U.S. PATENT DOCUMENTS

| | | | |
|---|---|---|---|
| 5,311,583 | 5/1994 | Friedes et al. | 379/209 |
| 5,343,512 | 8/1994 | Wang et al. | 455/12.1 X |
| 5,555,444 | 9/1996 | Diekelman et al. | 455/12.1 |
| 5,561,836 | 10/1996 | Sowles et al. | 455/12.1 |

FOREIGN PATENT DOCUMENTS

6-61900   3/1994   Japan .

Primary Examiner—Reinhard J. Eisenzopf
Assistant Examiner—Thanh Le
Attorney, Agent, or Firm—Sherry J. Whitney

[57] ABSTRACT

A method and apparatus for making a call connection in a communication system (10) having multiple communication units (26) (CU), and at least one communication antenna (12) that moves with respect to the multiple CUs (26). The method involves determining (154) whether a first call attempt from a source CU (26) to a target CU (50) is successful. When the first call attempt is not successful, a control facility (24) predicts (186) when one of the communication antenna (12) will move within an optimal call initiation area (124), within which there is a high likelihood of being able to establish a communication link with the target CU (50). The time when the communication antenna (12) will move within the optimal call initiation area (124) is sent (160) to the source CU (26) so that the source CU (26) may make a second call attempt (162) at that time.

15 Claims, 5 Drawing Sheets

POSITION-DEPENDENT CALL CONNECTION METHOD AND APPARATUS IN A RADIO-COMMUNICATION SYSTEM

CROSS-REFERENCE TO RELATED APPLICATIONS

This application is related to co-pending U.S. patent application Ser. No. 08/519,220 entitled "Dial-Back Call Completion Method and Apparatus in a Radio-Communication System", by Daniel Richard Tayloe, filed concurrently with this application and assigned to the same assignee as the present application.

FIELD OF THE INVENTION

The present invention relates generally to call connection in a radio-communication system, and more particularly to call connection in a satellite cellular communication system.

BACKGROUND OF THE INVENTION

In ground-based cellular communication systems, link margins of up to 35 decibels (dB) may be readily achieved. These link margins allow subscriber units to establish communication links where physical obstructions exist between the subscriber unit and the cellular antenna Thus, a person placing a call to a subscriber unit often may successfully call a subscriber unit located inside a car, a building, or an urban canyon (i.e., an area surrounded by high-rises).

Although a ground-based system may have a relatively good link margin, the success rate for placing a call is often 30% or less. Low call success rates result from excessive physical obstructions, widespread use of portable phones by other users, and spotty coverage by the cellular antennas. Generally, a person must make several call attempts before establishing a link with a subscriber unit. At times of very high communication traffic, many attempts may be necessary, thus frustrating system users.

Often times, a subscriber unit that is used to place a call (i.e., the "source unit") will be moved by the user to an area where little or no obstructions are located. This enhances the user's chance of establishing a link. However, the recipient of the call (i.e., the "target unit") may be another subscriber unit that is located in an area of excessive obstructions. The communication system may be incapable of supporting a link between the target unit and a cellular antenna.

Prior-art systems seek to alleviate these problems by boosting link margins, providing more channels, and increasing antenna coverage. However, the prior-art solutions are limited by the system's economic and physical constraints. Once a system is in place, prior-art systems often must settle for having a user make repeated attempts to establish a call.

A satellite communication system provides additional challenges to call establishment because such a system is likely to have a significantly lower link margin (e.g., in the range of 15 dB or less). The lower link margin results from the satellite antenna being located at a much greater distance from the subscriber units. Of course, more powerful equipment may provide a higher link margin, but such equipment is heavy and thus undesirable for a satellite application.

Additionally, for all satellite orbits except geosynchronous orbits, satellites move with respect to the subscriber units. Because of the lower link margins, a subscriber unit located in an urban canyon might have a small likelihood of establishing a link with a satellite that is low on the horizon. However, a satellite at a high angle of elevation may have a greater likelihood.

The prior-art repeated attempt method of establishing a communication link is undesirable for such a satellite communication system because a source unit generally has no knowledge of satellite positions with respect to a target unit. Thus, an unlucky user may try at various times of an entire day while never being able to establish a call.

What are needed are a method and apparatus for providing a high likelihood of establishing a call in a satellite communication system.

DETAILED DESCRIPTION OF THE DRAWINGS

The present invention provides a method and apparatus for providing a high likelihood of establishing a call in a satellite communication system. In summary, the method and apparatus of the present invention calculates opportunity times when there is a high likelihood of establishing a link between a target communication unit and a satellite. These opportunities are calculated by predicting the satellite's future positions with respect to an optimal call initiation area. The opportunity times are sent to the source communication unit so that the source unit's user knows when to attempt another call.

Figure 1:
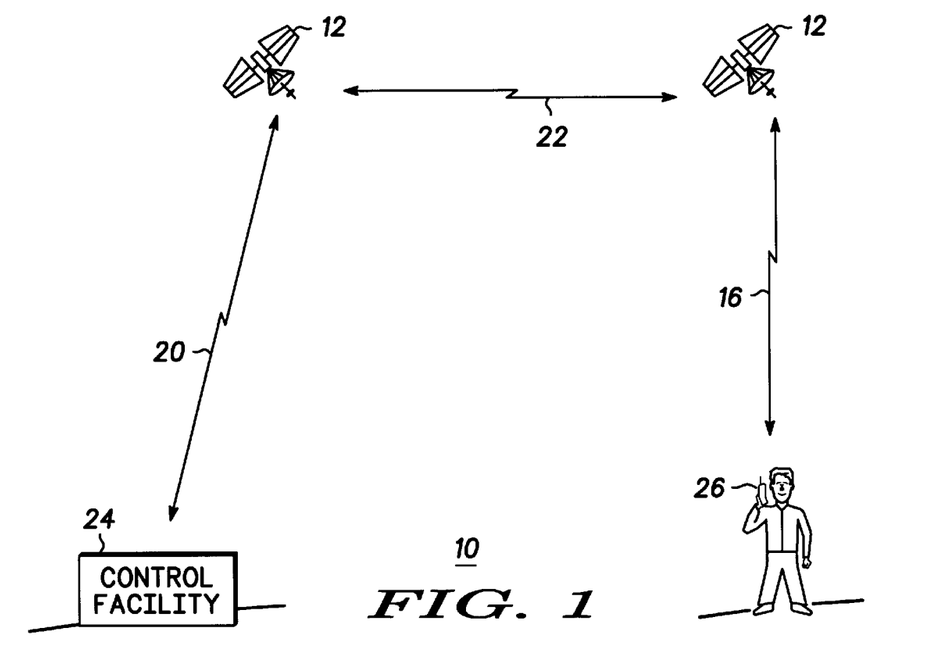
FIG. 1 illustrates a satellite communication system in accordance with a preferred embodiment of the present invention.

FIG. 1 illustrates a satellite communication system 10 in accordance with a preferred embodiment of the present invention. Communication system 10 includes control facility 24, orbiting satellites 12, and communication unit 26. Satellites 12 occupy orbits that can be low-earth orbits, medium-earth orbits, or a combination thereof. In a preferred embodiment, communications system 10 uses six polar orbital planes, with each orbital plane holding eleven satellites 12 for a total of sixty-six satellites 12. However, sixty-six satellites 12 are not essential, and more or fewer satellites 12, or more or fewer orbital planes can be used. For clarity, FIG. 1 illustrates only two satellites 12. However, only one satellite 12 is necessary to carry out the method of the present invention.

Satellites 12 communicate with terrestrial equipment which can be any number of communication units 26, control facility 24, other satellites 12, and possibly other communication devices (not shown). Communication link 16 between satellite 12 and communication unit 26 is accomplished by using communication cells projected by the satellites 12 toward the earth.

Figure 2:
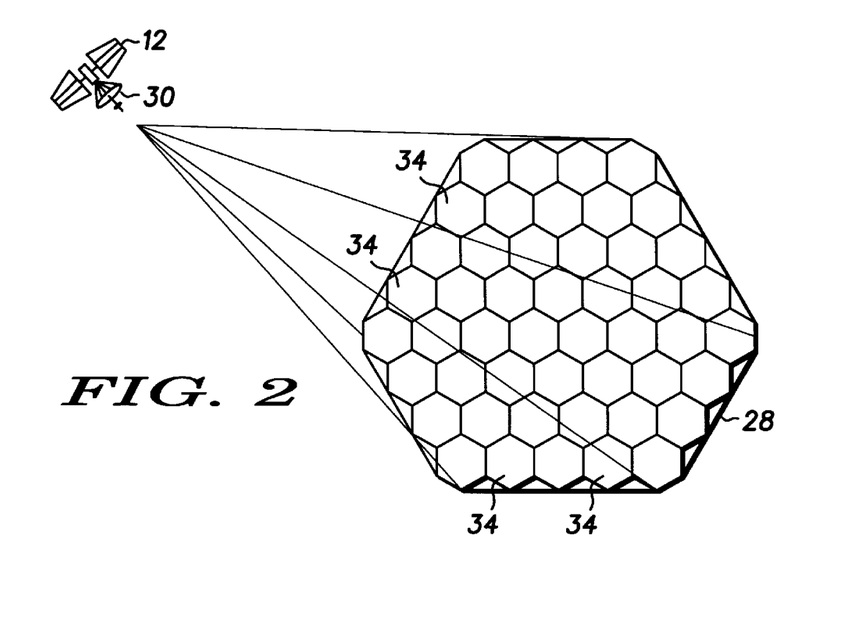
FIG. 2 illustrates a cellular projection from a satellite in accordance with a preferred embodiment of the present invention.

FIG. 2 illustrates a cellular projection from a satellite 12 in accordance with a preferred embodiment of the present invention. Satellite 12 has communication antenna 30 which projects a footprint 28 of communication cells 34 toward the face of the earth. Each communication cell 34 can contain multiple CUs which CUs may use.

Referring again to FIG. 1, communication link 20 between satellite 12 and control facility 24 is accomplished by using a direct radio-frequency or optical link. Communication link 22 between satellites 12 are referred to herein as "cross-links" and may not be required where a single satellite 12 is geographically capable of communicating with both a communication unit 26 and a control facility 24.

A communication unit 26 (CU) can be, for example, a hand-held, portable cellular telephone adapted to transmit data to and/or receive data from satellites 12. A CU 26 can also be a facsimile device, pager, data terminal, a telephone connected to a public switched telephone network (PSTN), or any other type of communication device. As used herein, a "source CU" is a CU that initiates an attempt to establish a communication path with a "target CU". A communication path can include any number of satellite-to-ground and satellite-to-satellite hops, depending on the location of the source CU relative to the target CU. As used herein, a "target link" is the link along the communication path between a satellite and the target CU.

A control facility 24 (CF) is an equipment facility, typically ground-based, that is capable of interfacing with satellites 12. CF 24 may communicate directly with satellites 12, or may communicate via remote or co-located ground stations (not shown).

Multiple CFs 24 can exist within communication system 10, each capable of providing different functions. Some CFs 24 connect with ground-based equipment such as, for example, a public switched telephone network (PSTN) (not shown). The same or other CFs 30 control operations of communication system 10.

In a preferred embodiment, CF 24 determines when a source CU 26 has failed an attempt at a call due to the target CU's 26 inability to establish a link with a satellite 12. CF 24 then calculates future call initiation opportunities during which target CU 26 will have a higher likelihood of link establishment and sends these future opportunities to the source CU 26. When the user of source CU 26 attempts a call during one of these future opportunities, the likelihood of success is increased. Determination of the call initiation opportunities is described in detail in conjunction with FIGS. 4–7.

Only one of CF 24 and CU 26 are shown in FIG. 1 for clarity and ease of understanding. In alternate embodiments, additional system facilities may be desirable, depending upon the requirements of the communication system.

Figure 3:
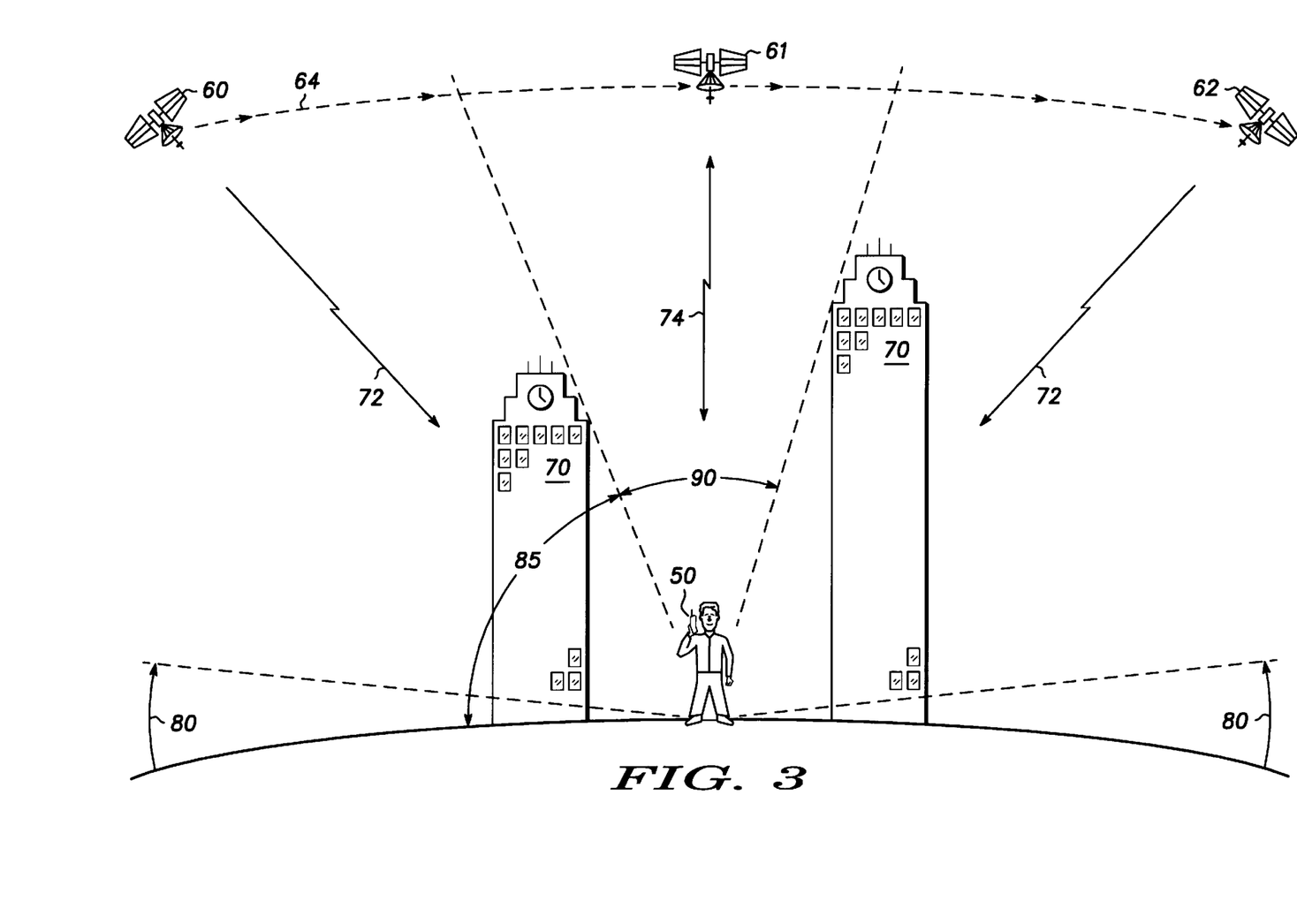
FIG. 3 illustrates geometric communication limitations for a satellite communication system user in accordance with a preferred embodiment of the present invention.

FIG. 3 illustrates geometric communication limitations for a satellite communication system user in accordance with a preferred embodiment of the present invention. A CU 50 may be located in an area having significant radio-frequency obstructions (e.g., buildings 70). Satellites 60–62 traveling along path 64 are required to support links 72, 74 with the CU 50. Where obstructions 70 exist between satellites 60, 62 and CU 50, links 72 may not be possible. However, where no obstructions exist between satellite 61 and CU 50, link 74 is highly possible.

Angle 80 represents a minimum angle of elevation above the horizon at which communications are possible between a satellite 60–62 and a CU 50. A user in an area with little or no obstruction is likely to be able to establish a link once a satellite 60–62 is located above angle 80. However, as illustrated in FIG. 3, a user in an urban canyon may not be able to establish a link until a satellite 60–62 has risen above the obstructions 70. Angle 85 represents an angle of elevation that a satellite must be located above for the CU 50 to establish communications. Angle 90 spans the area within which link 74 may be maintained. The area defined by angle 90 is referred to herein as a "call initiation area".

Figure 4:
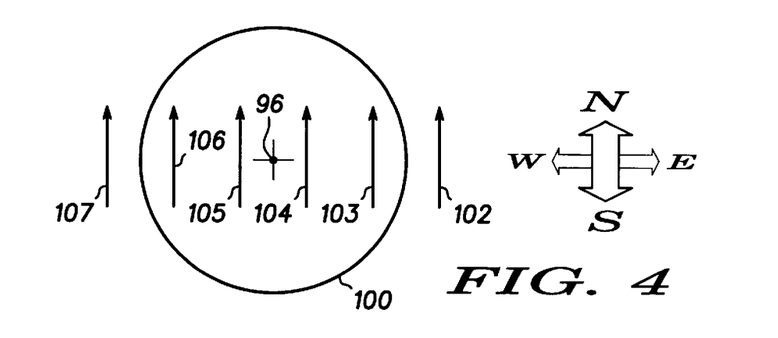
FIG. 4 illustrates a possible call initiation area in accordance with a preferred embodiment of the present invention.

FIG. 4 illustrates a possible call opportunity area 100 in accordance with a preferred embodiment of the present invention. Point 96 represents a location of a CU. Call opportunity area 100 represents an area defined by an angle of elevation that is high enough that there is a high likelihood that CU 96 will be capable of establishing a link with a satellite traveling in call opportunity area 100. Paths 102–107 represent possible paths of a satellite with respect to call opportunity area 100. Paths 102 and 107 fall outside call opportunity area 100. Thus, communications with satellites traveling along these paths is probably not highly likely. Paths 103–106 fall within call opportunity area 100 and communication with satellites traveling along these paths is highly likely.

As FIG. 4 illustrates, some paths have longer intersections of call opportunity area 100. For example, a satellite traveling along path 104 would be within call opportunity area 100 for a longer period of time than path 103. Thus, a satellite traveling along path 104 would be able to sustain a call for a longer period of time.

The length of time of a call also depends upon when a call is initiated during a satellite's path across call opportunity area 100. In a preferred embodiment, a source CU would want to initiate a call to a target CU 96 when a satellite first enters call opportunity area 100.

Figure 5:
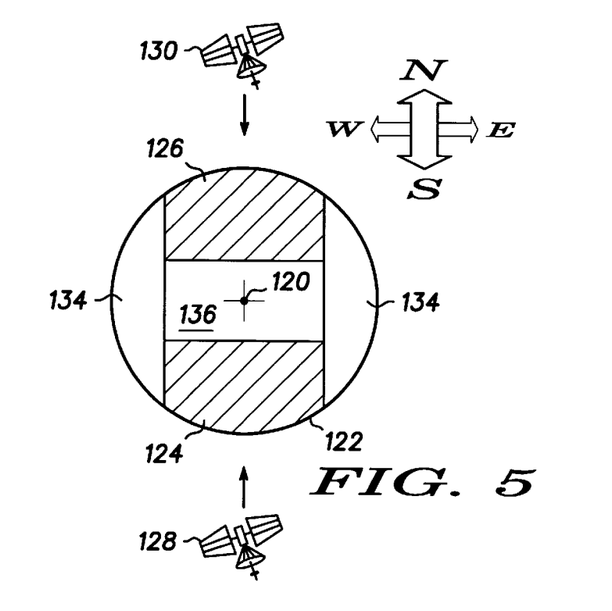
FIG. 5 illustrates optimal call initiation areas in accordance with a preferred embodiment of the present invention.

FIG. 5 illustrates optimal call initiation areas 124, 130 in accordance with a preferred embodiment of the present invention. CU 120 is located at the center of call opportunity area 122. Although satellites can travel in any direction, FIG. 5 shows satellite 128 traveling in a northbound direction and satellite 130 traveling in a southbound direction.

Optimal call initiation area 124 represents the portion of call opportunity area 122 within which satellite 128 should initiate a call to provide the CUs with a minimum acceptable call duration. Likewise, call initiation area 126 represents the portion of call opportunity area 122 within which satellite 130 should initiate a call. Areas 134 are excluded because neither satellite 128 nor 130 would intersect call opportunity area 122 for a long enough period of time to provide an acceptable call duration. Additionally, area 136 is excluded because a call is optimally initiated soon after a satellite enters call opportunity area 122. In alternate embodiments, excluded areas 134, 136 may be larger, smaller, or nonexistent depending on the duration of calls a communication system is willing to accept.

Note that the relative locations of optimal call initiation areas and excluded areas depends on the direction of travel of the satellites. For example, a satellite having a smaller angle of inclination from the horizon may intersect call opportunity area 122 in a substantially easterly direction. In such a case, an optimal call initiation area would be located along the western portion of call opportunity area 122.

Figure 6:
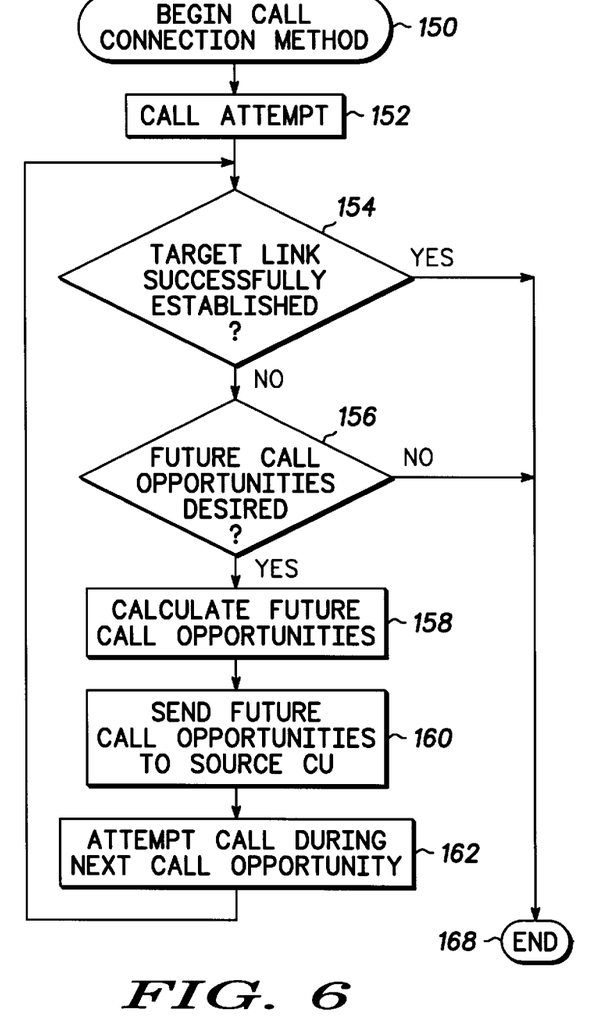
FIG. 6 illustrates a method for establishing a communication path when a satellite is within an optimal call initiation area in accordance with a preferred embodiment of the present invention.

FIG. 6 illustrates a method for establishing a communication path when a satellite is within an optimal call initiation area in accordance with a preferred embodiment of the present invention. The method begins in step 150 when a call attempt is made in step 152. In step 154, a determination is made whether the target link is successfully established. This determination can be made by a satellite or by a control facility. If the target link is successfully established, the method ends 168.

If the target link is not successfully established, the method continues. In a preferred embodiment, the satellite or control facility provides the source CU with an option in step 156 of whether the source CU wants the system to calculate future call opportunities. In an alternate embodiment, the system automatically determines the future call opportunities. The source CU can provide the option via a display to the user of the source CU who can either exercise the option or not by entering her choice using an input device. If the user of the source CU indicates that she does not want the system to determine the future call opportunities, the method ends 168.

The system can provide the calculation of future call opportunities as a special feature of the system by providing this option. If the user of the source CU decides to exercise the option, the system can charge the user a fee.

Figure 7:
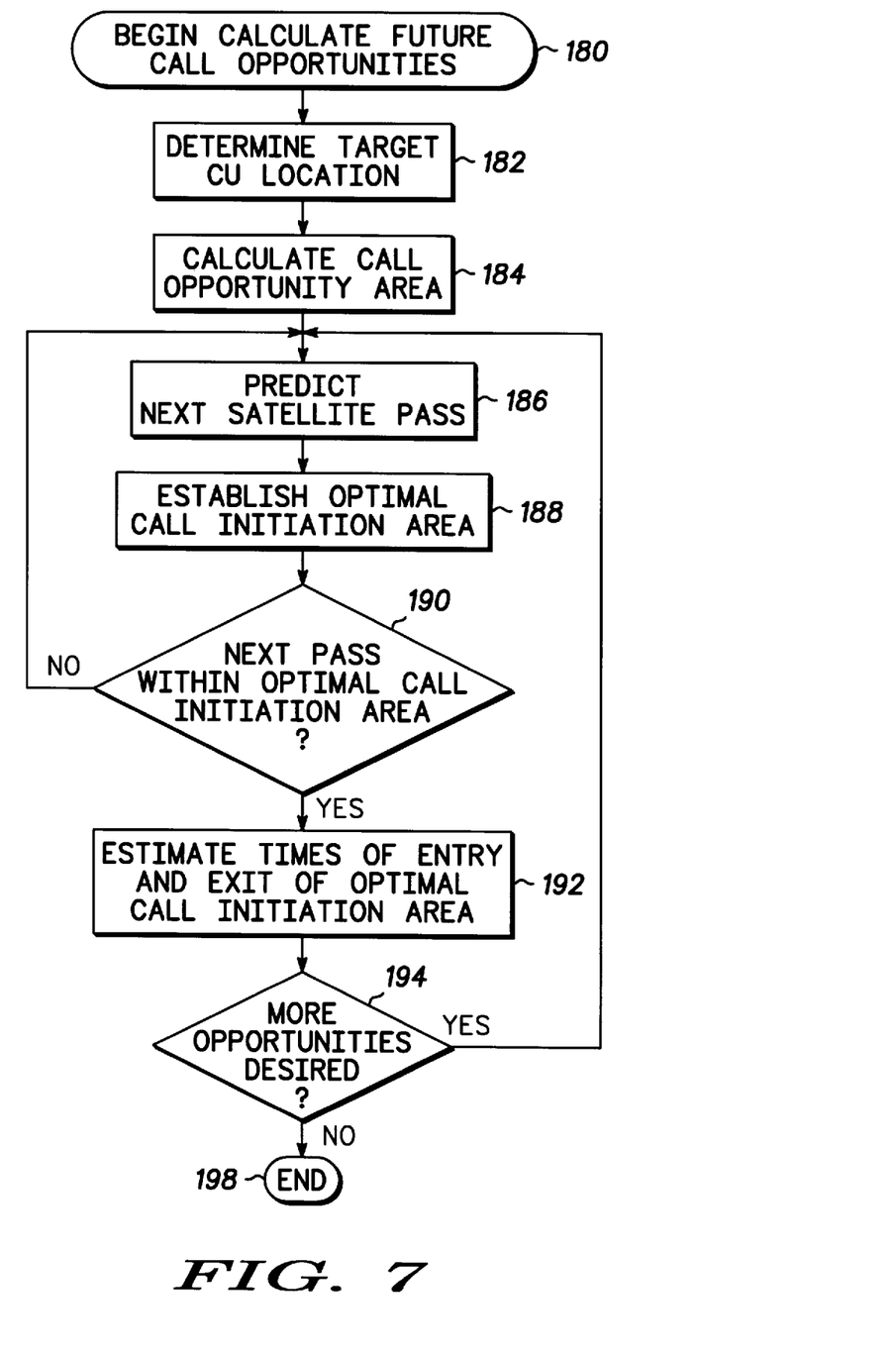
FIG. 7 illustrates a method for calculating future call opportunities in accordance with a preferred embodiment of the present invention.

If the source CU indicates that it would like the system to calculate the future call opportunities, step 158 calculates future call opportunities. For example, a future call opportunity can be represented by the times a satellite (e.g., satellite 128, FIG. 5) enters and exits an optimal call initiation area (e.g., area 124). The system may calculate only one opportunity or multiple opportunities. The number of opportunities calculated may be requested by the source CU. In a preferred embodiment, the calculations are performed in a control facility (e.g., CF 24, FIG. 1). In alternate embodiments, the calculations are performed in a satellite or a CU. FIG. 7 describes the step 158 of calculating future call opportunities in detail.

Referring back to FIG. 6, once future call opportunities are calculated, the CF (or satellite) sends the future call opportunities to the source CU in step 160. The CF can send only the time a next satellite will enter an optimal call initiation area with respect to the target CU, or the CF may send the time the satellite will exit the optimal call initiation area as well. Additionally, if multiple opportunities were calculated, the CF may send as many of the opportunities that were calculated or requested by the source CU.

In step 162, after a source CU receives the future call opportunities, a user of the source CU can attempt another call during any of the next call opportunities. In an alternate embodiment, the source CU may attempt a call automatically and notify the user when a communication path is successfully established. The method then iterates as shown in FIG. 6.

FIG. 7 illustrates a method for calculating future call opportunities in accordance with a preferred embodiment of the present invention. The method begins in step 180 by performing the step 182 of determining a location of the target CU. In a preferred embodiment, the location is a last-known location of the target CU as reported to the system. In alternate embodiments, the location of the target CU may be derived in other ways.

Next, step 184 calculates a call opportunity area (e.g., call opportunity area 100, FIG. 4) for the target CU. The call opportunity area is defined by the angle of elevation from the horizon that the satellite is likely to be able to support communications with the target CU. Step 186 then predicts a next satellite pass that might intersect the call opportunity area. In a preferred embodiment, satellite passes can be predicted because a satellite's orbital parameters and the known current position can be extrapolated into the future to create a predicted future position of a satellite.

From the path of the next satellite pass, step 188 establishes an optimal call initiation area (e.g., area 124, FIG. 5) as a portion of the call opportunity area. As described in conjunction with FIG. 5, the optimal call initiation area is determined so that a call between the source CU and the target CU may have a duration that is greater than a minimum acceptable call duration.

Step 190 determines whether a next satellite pass is within an optimal call initiation area. If not, CF continues to predict satellite passes in step 186. If a next satellite pass does fall within an optimal call initiation area, step 192 estimates the time that the satellite enters the optimal call initiation area In a preferred embodiment, CF also estimates the time the satellite exits the optimal call initiation area. In step 194, CF determines whether more future call initiation opportunities are desired. If so, CF repeats steps 186–194. If not, the method ends in step 198.

Figure 8:
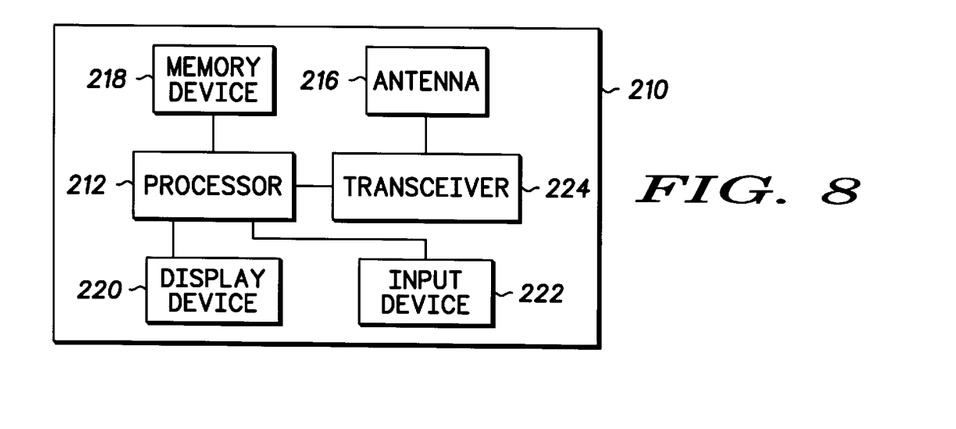
FIG. 8 illustrates a communication unit in accordance with a preferred embodiment of the present invention.

FIG. 8 illustrates a communication unit 210 in accordance with a preferred embodiment of the present invention. CU 210 includes processor 212, transceiver 214, antenna 216, and memory device 218. Transceiver 214 receives messages via antenna 216 from satellites (e.g., satellite 12, FIG. 1), including receiving future call opportunities. Processor 212 is coupled to transceiver 214 and performs the functions of making call attempts and, in a preferred embodiment, providing a user with an option whether to have the communication system calculate future call opportunities. Memory device 218 is coupled to processor 212 and is used for storing the future call opportunities.

In a preferred embodiment, CU 210 is provided with an option of whether to have the future call opportunity sent to the CU 210, and CU 210 further includes display device 220 and input device 222. Display device 220 is coupled to processor 212 and is used to display the option to a user of CU 210. Input device 222 is coupled to processor 212 and is used to allow the user to input information indicating that the user wants to exercise the option.

Figure 9:
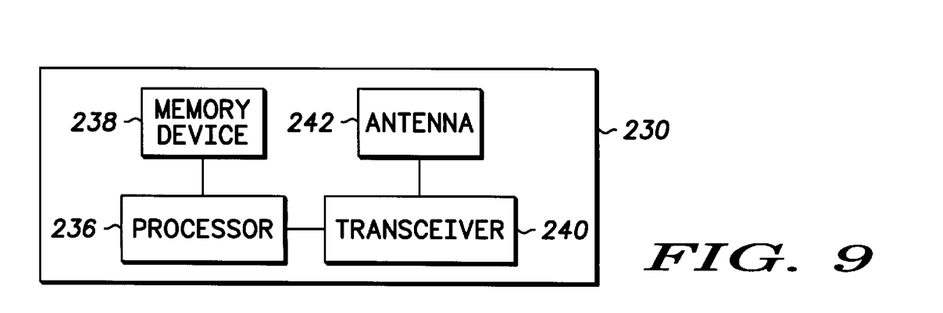
FIG. 9 illustrates a control facility in accordance with a preferred embodiment of the present invention.

FIG. 9 illustrates a control facility in accordance with a preferred embodiment of the present invention. CF 230 includes processor 236, transceiver 240, antenna 242, and memory device 238. Transceiver 240 is used to communicate with satellites and CUs via antenna 242, including sending future call opportunities to source CUs. Processor 236 is coupled to transceiver 240 and is used for determining whether a source CU has successfully established a communication path with a target CU and calculating future call opportunities. Memory device 238 is coupled to processor 236 and is used for storing information necessary to calculate future call opportunities.

In summary, a method and apparatus has been described for determining optimal call initiation opportunities and for initiating calls during those opportunities. The foregoing description of the specific embodiments will so fully reveal the general nature of the invention that others can, by applying current knowledge, readily modify or adapt for various applications such specific embodiments without departing from the generic concept and, therefore, such adaptations and modifications should and are intended to be comprehended within the meaning and range of equivalents of the disclosed embodiments. In particular, while a preferred embodiment has been described in terms of a satellite communication system, the method and apparatus of the present invention may be utilized for any communication system having a liklihood of call success that varies due to predictable paths of antennas.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A method for establishing a communication path in a communication system having multiple communication units, at least one communication antenna that predictably changes a position with respect to a target communication unit, and at least one control facility, the method comprising the steps of:
   a) determining whether a target link is successfully established when a source communication unit makes a first call attempt to establish the communication path with the target communication unit, the communication path requiring establishment of the target link between the target communication unit and one of the at least one communication antenna;
   b) where the target link is not successfully established, calculating a future call opportunity when the target communication unit will have a better opportunity to support the target link because a predicted future position of one of the at least one communication antenna will have moved within an optimal call initiation area with respect to the target communication unit; and
   c) sending the future call opportunity to the source communication unit so that the source communication unit may make a second call attempt to establish the communication path with the target communication unit at the future call opportunity.

2. The method as claimed in claim 1 further comprising the steps of:
   d) providing the source communication unit with an option of whether or not to have the communication system calculate the future call opportunity;
   e) when the source communication unit exercises the option, performing steps b) through c); and
   f) when the source communication unit does not exercise the option, not performing steps b) through c).

3. The method as claimed in claim 1 wherein the step of calculating the future call opportunity comprises the steps of:
   b1) establishing the optimal call initiation area within which one of the at least one communication antenna should be located for the target link to be highly possible, wherein one of the at least one communication antenna should be located within the optimal call initiation area when the source communication unit makes the second call attempt;
   b2) predicting a next antenna to move within the optimal call initiation area;
   b3) estimating a first time when the next antenna will enter the optimal call initiation area; and
   b4) calculating the future call opportunity as the first time.

4. The method as claimed in claim 3 wherein the step of establishing the optimal call initiation area comprises the steps of:
   b1a) determining a last-known location of the target communication unit as a most recent location of the target communication unit reported to the communication system;
   b1b) calculating a call opportunity area that is defined by an angle of elevation between the last-known location and a horizon such that one of the at least one communication antenna is more likely to be able to support the target link; and
   b1c) determining the optimal call initiation area as a portion of the call opportunity area, wherein the optimal call initiation area is determined so that a call between the source communication unit and the target communication unit may have a duration that is greater than a minimum acceptable call duration.

5. The method as claimed in claim 3 wherein the step of calculating the future call opportunity further comprises the steps of:
   b6) estimating a second time when the next antenna will exit the optimal call initiation area; and
   b7) calculating the future call opportunity as times between the first time and the second time.

6. The method as claimed in claim 1 further comprising the steps of:
   e) calculating at least one additional future call opportunity; and
   f) sending the at least one additional future call opportunity to the source communication unit.

7. A method for establishing a communication path in a communication system having multiple communication units, at least one satellite that predictably changes a position with respect to a target communication unit, and at least one control facility, the method comprising the steps of:
   a) making a first call attempt by a source communication unit to establish the communication path with the target communication unit, the communication path requiring establishment of a target link between the target communication unit and one of the at least one satellite;
   b) determining whether the target link is successfully established;
   c) where the target link is not successfully established, calculating a future call opportunity when the target communication unit will have a better opportunity to support the target link because a predicted future position of one of the at least one satellite will have moved within an optimal call initiation area with respect to the target communication unit;
   d) sending the future call opportunity to the source communication unit; and
   e) making a second call attempt by the source communication unit to establish the communication path with the target communication unit at the future call opportunity.

8. A method for establishing a communication path in a communication system having multiple communication units, at least one communication antenna that predictably changes a position with respect to a target communication unit, and at least one control facility, the method comprising the steps of:
   a) making a first call attempt by a source communication unit to establish the communication path with the target communication unit, the communication path including a target link between the target communication unit and one of the at least one communication antenna;
   b) where the first call attempt is not successful, receiving a future call opportunity during which time the target communication unit will have a better opportunity to support the target link because a predicted future position of one of the at least one antenna will have moved within an optimal call initiation area with respect to the target communication unit; and c) making a second call attempt by the source communication unit to establish the communication path with the target communication unit during the future call opportunity.

9. The method as claimed in claim 8 further comprising the steps of:

d) the source communication unit being provided with an option of whether or not to have the communication system calculate the future call opportunity;

e) presenting a user of the source communication unit with the option;

f) when the user indicates that the user wants to exercise the option, performing steps b) through c); and g) when the user indicates that the user does not want to exercise the option, not performing steps b) through c).

10. The method as claimed in claim 8 further comprising the steps of:

d) receiving at least one additional future call opportunity; and e) making at least one additional call attempt by the source communication unit to establish the communication path with the target communication unit during the at least one additional future call opportunity.

11. The method as claimed in claim 8 wherein the step of receiving the future call opportunity comprises the steps of:

b1) establishing the optimal call initiation area within which one of the at least one communication antenna should be located for the target link to be highly possible, wherein one of the at least one communication antenna should be located within the optimal call initiation area when the source communication unit makes the second call attempt;

b2) predicting a next antenna to move within the optimal call initiation area;

b3) estimating a first time when the next antenna will enter the optimal call initiation area;

b4) calculating the future call opportunity as the first time; and b5) sending the future call opportunity to the source communication unit.

12. The method as claimed in claim 11 wherein the step of establishing the optimal call initiation area comprises the steps of:

b1a) determining a last-known location of the target communication unit as a most recent location of the target communication unit reported to the communication system;

b1b) calculating a call opportunity area that is defined by an angle of elevation between the last-known location and a horizon such that one of the at least one communication antenna is more likely to be able to support the target link; and b1c) determining the optimal call initiation area as a portion of the call opportunity area, wherein the optimal call initiation area is determined so that a call between the source communication unit and the target communication unit may have a duration that is greater than a minimum acceptable call duration.

13. A communication unit comprising:

a transceiver for receiving messages from at least one antenna that moves with respect to the communication unit;

a processor coupled to the transceiver for making a first call attempt to establish a communication path with a target communication unit, the communication path including a target link between the communication unit and one of the at least one antenna, receiving via the transceiver a future call opportunity at which the target communication unit will have a better opportunity to support the target link because a predicted future position of one of the at least one antenna will be within an optimal call initiation area with respect to the target communication unit, and making a second call attempt to establish the communication path with the target communication unit at the future call opportunity; and a memory device coupled to the processor for storing the future call opportunity.

14. The communication unit as claimed in claim 13 wherein the processor is also for being provided with an option of whether to have the future call opportunity sent to the communication unit, the communication unit further comprising:

a display device coupled to the processor for displaying the option to a user of the communication unit; and an input device coupled to the processor for allowing the user to input information indicating that the user wants to exercise the option.

15. A call opportunity calculation apparatus comprising:

a transceiver for sending messages to a source communication unit;

a processor coupled to the transceiver for determining whether the source communication unit has successfully established a communication path with a target communication unit, the communication path including a target link between the target communication unit and at least one antenna that moves with respect to the target communication unit, the processor also for calculating a future call opportunity at which the source communication unit will have a better opportunity to establish the communication path because a predicted future position of one of the at least one antenna will be within an optimal call initiation area with respect to the target communication unit, and for sending the future call opportunity to the source communication unit; and a memory device coupled to the processor for storing information necessary to calculate the future call opportunity.

* * * * *